United States Patent Office 3,365,319
Patented Jan. 23, 1968

3,365,319
HIGH STRENGTH INORGANIC
CEMENT COMPOSITIONS
Michael J. Link, Nitro, W. Va., assignor to Union
Carbide Corporation, a corporation of New York
No Drawing. Filed Nov. 5, 1964, Ser. No. 409,307
8 Claims. (Cl. 106—90)

ABSTRACT OF THE DISCLOSURE

A method for improving the physical properties of Portland cement compositions by incorporating from about 0.01 to about 2 percent by weight glyoxal based on the dry weight of the Portland cement in the composition. The composition for the practice of the method is also novel.

This invention relates to inorganic cement compositions of improved properties. More particularly, this invention relates to the addition of minor amounts of glyoxal to inorganic cement compositions whereby the compressive strength is substantially increased and other important physical properties markedly improved. Comprehended within the broad scope of the invention are neat cements, mortars and concretes having minor amounts of glyoxal incorporated therein.

Many materials, both organic and inorganic in nature, have been utilized as admixtures in inorganic cement compositions to modify one or more of the properties of the cement. Thus, for example, aliphatic alcohols have been added to retard the setting rate, calcium lignosulfate has been employed to increase the cohesive and compressive strength, and sodium silicate has been utilized as a surface hardener. Latexes such as those based on butadiene-styrene and vinyl acetate polymers have also found widespread application as admixtures because of their ability to increase the strength and abrasion resistance of cement compositions. However, certain disadvantages occur with the use of many of the admixtures heretofore proposed for incorporation in cementitious systems. Thus, in general, a particular admixture will effect improvement in only a single property or frequently it is a material which is many times more costly than the cement itself and yet must be utilized in relatively large proportions, such as up to about 20 percent or more of the weight of the cement, to be effective.

It is a general object of this invention to provide inorganic cement compositions of improved properties. A more specific object is to provide inorganic cement compositions of increased tensile and compressive strength. Another object is to provide a method of reducing the water of workability required in inorganic cement compositions. A further object is to provide a method of controlling the time of set of inorganic cement compositions. Yet another object of the invention is to provide an admixture for inorganic cement compositions which is effective in modifying the properties of these compositions when employed in very small amounts. Other objects and advantages of this invention will become apparent to one skilled in the art in light of the disclosure which follows.

It has now been found that the addition of small amounts of glyoxal (O=CH—CH=O) to inorganic cement compositions results in remarkable improvement in the properties thereof and, accordingly, the present invention includes within its scope all cement compositions comprising an inorganic cement and a strength improving amount of glyoxal. The amount of glyoxal required to effect the maximum improvement in the properties of an inorganic cement composition is dependent to some extent on the type of cement and on the other components present in the composition but the optimum amount in a particular instance can be readily determined by routine experimentation. Most usually, amounts of from about 0.01 percent by weight of glyoxal, based on the dry weight of inorganic cement, to about 2 percent by weight, or more, are employed, while preferred amounts are from about 0.05 percent to about 1 percent.

The improved inorganic cement compositions of this invention exhibit a unique combination of desirable properties. Compressive strengths have been found to be increased by as much as 50 percent, or more, compared to that of the same cement composition without the benefit of the added glyoxal, while, in addition, a moderate increase in tensile strength is often effected. A particularly important benefit of the addition of glyoxal to inorganic cement compositions in accordance with the method of this invention is the resulting reduction in the "water of workability" required. As is well known, the stoichiometric amount of water required for reaction with the cement is almost always insufficient to permit preparation of a slurry that can be conveniently handled so additional water, termed "water of workability," is normally added. The water of workability adversely changes almost every desired property of the hardened cement product and it is therefore important to keep the amount of such water to a minimum. By the addition of glyoxal in the amounts specified herein, the required water of workability is often reduced by as much as 10 to 15 percent or more. Effective control of the time to initial set may also be achieved by the incorporation of minor amounts of glyoxal in an inorganic cement composition.

The degree of improvement in the compressive strength of inorganic cement compositions resulting from addition of glyoxal thereto in accordance with this invention generally increases, to a degree, with increasing concentration of the glyoxal. However, the initial time of set is increased by the addition of low concentration of glyoxal, such as amounts of less than about 1 weight percent, but decreased by higher concentrations and thus passes through a maximum as the concentration of glyoxal is varied.

The present invention is applicable to all cementitious systems comprising an inorganic cement. For example, glyoxal can be successfully employed to improve the properties of grouts (cement-water mixtures) and mortars (compositions containing sand, cement and water) as well as concretes (compositions containing aggregate such as gravel, crushed stone, etc. along with sand, cement and water). The term "inorganic cement" as employed herein and in the appended claims is intended to include the hydraulic cements, the lime cements, the gypsum cements, and the plaster cements. Of these the hydraulic cements are of particular importance and, accordingly, serve as components of a preferred class of inorganic cement compositions within the broad scope of this invention. The term "hydraulic cement" is recognized in the art as defining a definite class and it is intended to cover all members of such class by the claims appended hereto. Hydraulic cements include, but are not limited to, the Portland cements, the natural cements, the white cements, the aluminous cements, the grappier cements, the hydraulic limes, and the puzzolanic cements including those derived from industrial slags. The hydraulic cement which is most widely used, because of its amenability to low cost production, is Portland cement, and Portland cement compositions containing small amounts of glyoxal are particularly preferred compositions within the scope of this invention.

Glyoxal may be incorporated in inorganic cement compositions in accordance with this invention in any suitable manner. Thus, the glyoxal may be dissolved in the water employed in formulating the cement composition or may be employed in a spray dried form and dry blended with the cement during one of the conventional steps in cement manufacture, for example, during the finish grinding operation. In preparing concrete, the glyoxal may be used in admixture with the dry cement or admixed with any one of the other components of the concrete prior to the incorporation of the dry cement. Glyoxal is available commercially as a 40 percent aqueous solution which contains small amounts of ethylene glycol, glycolic acid, formic acid and formaldehyde and such commercial material is fully satisfactory for the purposes of this invention and can be added to the water used in formulating the cement composition.

The improved inorganic cement compositions of this invention find application wherever cement compositions are ordinarily used but are particularly applicable in uses wherein very high ultimate compressive strength is essential or when rapid development of strength is important. Areas of application where the enhanced properties disclosed herein offer particularly striking advantages are, for example, in the construction of high rise buildings and the preparation of prestressed concrete.

Further illustration of the invention is provided by the examples which follow. In the examples, the mixing procedure set forth in detail below was utilized in all cases and evaluation of the cement compositions was made in accordance with accepted test procedures of the ASTM (American Society for Testing Materials), which are listed below along with a description of any modification of the standard test procedure resorted to in obtaining the data.

*Slump.*—Determined by ASTM C 143–58.
*Air content.*—Determined by ASTM C 231–60.
*Time of set.*—Determined by ASTM C 403–61 T except that the mortar containers employed were 4" x 4" x 16" molds of ¾" thick plywood that had been coated with paraffin to act as a release agent and to prevent loss of water to the mold.
*Compressive strength.*—Determined by ASTM C 39–61. Test specimens were prepared in accordance with the method described in ASTM C 192–59, the cylindrical specimens being 4 inches in diameter by 8 inches in length and the maximum size aggregate being ¾" nominal size.
*Tensile strength.*—Determined by ASTM C 496–62 T.
*Volume change.*—Determined by ASTM C 157–60 T.
*Mixing procedure.*—Concrete samples evaluated herein were prepared in accordance with the following schedule of steps. In each instance where glyoxal was utilized, it was added to the water charged in step (3).

(1) The mixer was "buttered" with a ⅓ size batch.
(2) The "butter batch" was discarded.
(3) Three-fourths of the anticipated water requirement was charged to the mixer.
(4) All of the sand and stone was charged to the mixer (with the percent moisture contents on each being determined subsequently by oven drying of samples).
(5) The mixer was operated for 15 seconds.
(6) All of the cement was charged to the mixer.
(7) The mixer was operated for a two minute period during which additional water was added in an amount sufficient to give a 3±½ inch slump.
(8) The mix was permitted to stand for a two minute period.
(9) The mixer was operated for two minutes.
(10) Mixing was stopped and tests run for slump, air content and unit weight.
(11) The tested material of step (10) was returned to the mixer and re-mixed.
(12) The entire batch was discharged into a metal tub and specimens for the proposed tests were cast. After casting, all specimens were aged at 74° F. and 95+% relative humidity.

*Example 1*

A series of concrete mixes containing various concentrations of glyoxal were prepared in accordance with the mixing procedure described above and the time of set and compressive strengths determined. The test data are summarized for convenience in Table I below with the quantities of material given being on the basis of one cubic yard of concrete.

TABLE I

| Test No. | Cement[1] (lbs.) | Sand[2] (lbs.) | Stone[3] (lbs.) | Glyoxal[4] (wt. percent) | W/C[5] | Percent Air | Unit Weight (lbs./ft.³) | Time of set (hrs.) | | Compressive Strength (p.s.i.) | | | |
|---|---|---|---|---|---|---|---|---|---|---|---|---|---|
| | | | | | | | | Initial | Final | 7 days | 14 days | 28 days | 56 days |
| I-A | 564 | 1,330 | 1,430 | 0 | 0.54 | 2.4 | 145.2 | 4.5 | 6.5 | 3,560 | 4,200 | 4,530 | 4,670 |
| I-B | 564 | 1,330 | 1,430 | 0.035 | 0.48 | 2.3 | 143.0 | 4.8 | 6.8 | 4,060 | 4,650 | 4,880 | |
| I-C | 564 | 1,330 | 1,430 | 0.07 | 0.51 | 2.6 | 142.6 | 5.1 | 6.8 | 4,250 | 4,780 | 5,520 | 5,820 |
| I-D | 564 | 1,330 | 1,430 | 0.10 | 0.45 | 2.7 | 143.4 | 4.8 | 6.8 | 4,890 | 5,250 | 6,300 | 6,600 |

[1] Type I, Lehigh Portland Cement Company.
[2] 3.30 F.M. (fineness modulus) River Sand.
[3] ¾" M.S.A. (maximum size aggregate) River Gravel.
[4] Values reported are for 100% glyoxal and are based on the weight of dry cement.
[5] Water to cement ratio for a slump of 3±½".

Consideration of the above results indicates that the addition of glyoxal brings about a substantial increase in the compressive strength of the concrete and a substantial reduction in the total water required. For example, the addition of 0.10 percent glyoxal, based on the dry weight of cement, resulted in an increase in the 28-day compressive strength of almost 40 percent and a reduction in the total water required of about 17 percent.

*Example 2*

Two concrete mixes, one a conventional mix and the other containing a small amount of glyoxal, were prepared in accordance with the mixing procedure described above and both the compressive and tensile strengths were determined. The test data are summarized for convenience in Table II below with the quantities of material given being on the basis of one cubic yard of concrete.

TABLE II

| Test No. | Cement[1] (lbs.) | Sand[2] (lbs.) | Stone[3] (lbs.) | Glyoxal[4] (wt. percent) | W/C[5] | Percent Air | Unit Weight (lbs./ft.³) | 28-day Tensile Strength (p.s.i.) | Compressive Strength (p.s.i.) | | | | | |
|---|---|---|---|---|---|---|---|---|---|---|---|---|---|---|
| | | | | | | | | | 7 days | 14 days | 28 days | 56 days | 90 days | 180 days |
| II-A | 600 | 1,260 | 2,000 | 0 | 0.53 | 0.8 | 150.8 | 540 | 4,050 | 4,430 | 4,580 | 5,220 | 6,000 | 6,200 |
| II-B | 600 | 1,260 | 2,000 | 0.15 | 0.50 | 1.0 | 151.2 | 615 | 5,700 | 6,230 | 6,990 | 7,550 | 8,190 | 8,550 |

[1] Type I, Lehigh Portland Cement Company.
[2] 2.30 F.M. (fineness modulus) River Sand.
[3] ¾" M.S.A. (maximum size aggregate) Indiana Limestone.
[4] Values reported are for 100% glyoxal and are based on the weight of dry cement.
[5] Water to cement ratio for a slump of 3±½".

Consideration of the above results indicates that the addition of glyoxal results in a substantial increase in the compressive strength of the concrete regardless of the aging period to which the specimen is subjected. Thus, the addition of 0.15 percent glyoxal, based on the dry weight of cement, resulted in a 41 percent increase in 7-day strength, a 52 percent increase in 28-day strength, and a 38 percent increase in 180-day strength. The 28-day tensile strength was increased about 12 percent by addition of 0.15 weight percent glyoxal.

*Example 3*

A third series of concrete mixes containing various concentrations of glyoxal were prepared in accordance with the mixing procedure described above and the compressive strength and time of set values were recorded. The test data are summarized for convenience in Table III below with the quantities of material given being on the basis of one cubic yard of concrete.

TABLE III

| Test No. | Cement[1] (lbs.) | Sand[2] (lbs.) | Stone[3] (lbs.) | Glyoxal[4] (wt. percent) | W/C[5] | Percent Air | Unit Weight (lbs./ft.$^3$) | 250 p.s.i.[6] | Time of Set (hrs.) | | Compressive Strength (p.s.i.) | | | |
|---|---|---|---|---|---|---|---|---|---|---|---|---|---|---|
| | | | | | | | | | Initial | Final | 7 days | 14 days | 28 days | 56 days |
| III-A[7] | 564 | 1,450 | 1,430 | 0 | 0.57 | 2.0 | 142.0 | 3.00 | 3.8 | 5.4 | 4,710 | 5,230 | 5,930 | 6,460 |
| III-B | 564 | 1,450 | 1,430 | 0.05 | 0.53 | 1.8 | 141.2 | 4.00 | 4.5 | 6.3 | 4,730 | 5,520 | 6,020 | 6,050 |
| III-C | 564 | 1,450 | 1,430 | 0.1 | 0.53 | 2.3 | 140.8 | 4.25 | 4.6 | ---- | 5,280 | 5,900 | 6,550 | 6,850 |
| III-D | 564 | 1,450 | 1,430 | 0.2 | 0.45 | 2.1 | 140.4 | 4.50 | 5.0 | 7.5 | 6,230 | 6,650 | 7,200 | 7,880 |
| III-E | 564 | 1,450 | 1,430 | 0.4 | 0.48 | 2.6 | 140.0 | 6.50 | ---- | ---- | 6,600 | 7,450 | 7,900 | 8,050 |
| III-F | 564 | 1,450 | 1,430 | 0.6 | 0.49 | 2.1 | 141.2 | [8] >6.5 | ---- | ---- | 6,400 | 7,660 | 8,050 | 8,970 |
| III-G | 564 | 1,450 | 1,430 | 1.0 | 0.45 | 3.4 | 141.6 | [9] >6.0 | ---- | ---- | 5,950 | 7,300 | 7,800 | 8,680 |

[1] Type I, Lehigh Portland Cement Company.
[2] 3.30 F.M. (fineness modulus) River Sand.
[3] 3/4" M.S.A. (maximum size aggregate) River Gravel.
[4] Values reported are for 100% glyoxal and are based on the weight of dry cement.
[5] Water to cement ratio for a slump of 3±½".
[6] Time to reach a penetration resistance of 250 p.s.i.
[7] Values reported are an average of four separate tests.
[8] 160 p.s.i. penetration resistance at 6.5 hours.
[9] 128 p.s.i. penetration resistance at 6.0 hours.

Consideration of the above results indicates that the addition of glyoxal substantially increases the compressive strength of concrete and that increasing the concentration of glyoxal up to about 1 percent, based on the dry weight of cement, results in an increase in the time of set, i.e. the setting of the concrete is retarded.

*Example 4*

A concrete mix identical to those described in Example 3 above was prepared except that the amount of glyoxal added was sufficient to give a concentration of 3.0 percent, based on the weight of dry cement. As a result of the high concentration of glyoxal the concrete set substantially instantaneously, i.e. flash set. This test indicates that high concentrations of glyoxal bring about a reversal in the effect on time of set resulting from addition of low concentrations, such as concentrations of less than about 1 weight percent, and in fact can greatly accelerate the setting of the concrete. Effective control over the time of set can thus be achieved by varying the amount of glyoxal incorporated in an inorganic cement composition in accordance with the method of this invention.

What is claimed is:

1. A cement composition consisting essentially of Portland cement and a strength improving amount of glyoxal.
2. A cement composition comprising Portland cement and from about 0.01 to about 2 percent by weight of glyoxal based on the dry weight of the Portland cement.
3. A cement composition comprising Portland cement and from about 0.05 to about 1 percent by weight of glyoxal based on the dry weight of the Portland cement.
4. Concrete comprising Portland cement and aggregate and from about 0.01 to about 2 percent by weight of glyoxal based on the dry weight of the Portland cement.
5. A method of improving the physical properties of a Portland cement composition which consists essentially of incorporating in said composition a strength improving amount of glyoxal.
6. A method of improving the physical properties of a Portland cement composition which comprises incorporating in said composition from about 0.01 to about 2 percent by weight, based on the dry weight of the Portland cement, of glyoxal.
7. A method of improving the physical properties of a Portland cement composition which comprises incorporating in said composition from about 0.05 to about 1 percent by weight, based on the dry weight of Portland cement, of glyoxal.
8. A method of improving the physical properties of concrete comprising Portland cement and aggregate which comprises incorporating therein from about 0.05 to about 1 percent by weight of glyoxal based on the dry weight of the Portland cement.

References Cited

UNITED STATES PATENTS

| 2,225,146 | 12/1940 | Bechtold | 106—90 |
| 3,028,340 | 4/1962 | Gandon et al. | 106—74 |
| 3,144,347 | 8/1964 | Cowan | 106—90 |
| 3,216,966 | 11/1965 | Collins et al. | 106—90 |

TOBIAS E. LEVOW, *Primary Examiner.*

S. E. MOTT, *Assistant Examiner.*